(12) United States Patent
Mohammad et al.

(10) Patent No.: US 7,620,778 B2
(45) Date of Patent: Nov. 17, 2009

(54) LOW POWER MICROPROCESSOR CACHE MEMORY AND METHOD OF OPERATION

(75) Inventors: Baker Mohammad, Austin, TX (US); Muhammad Ahmed, Austin, TX (US); Paul Bassett, Austin, TX (US); Sujat Jamil, Austin, TX (US); Ajay Anant Ingle, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 11/137,183

(22) Filed: May 25, 2005

(65) Prior Publication Data

US 2006/0268592 A1 Nov. 30, 2006

(51) Int. Cl.
*G06F 12/00* (2006.01)
(52) U.S. Cl. .................. 711/144; 711/154; 711/156
(58) Field of Classification Search .................. None
See application file for complete search history.

(56) References Cited

U.S. PATENT DOCUMENTS

| | | | |
|---|---|---|---|
| 4,901,397 A | | 2/1990 | Gilhousen et al. |
| 5,103,459 A | | 4/1992 | Gilshousen et al. |
| 6,166,939 A | | 12/2000 | Nataraj et al. |
| 6,804,133 B1 | * | 10/2004 | Khanna ................. 365/49 |
| 2001/0026465 A1 | * | 10/2001 | Choi et al. ............. 365/49 |
| 2003/0093616 A1 | | 5/2003 | Slavin |

FOREIGN PATENT DOCUMENTS

EP 0 905 709 A2 3/1999
KR 2001-91109 10/2001

OTHER PUBLICATIONS

John Hennessy and David Patterson, Computer Architecture—A Quantitative Approach, 1996, Morgan Kaufmann Publishers, Second Edition, pp. 125 and 758.*
International Search Report - PCT/US06/020640 - International Search Authority - European Patent Office - Dec. 22, 2006.
Written Opinion - PCT/US06/020640 - International Search Authority - European Patent Office - Dec. 22, 2006.
International Preliminary Report on Patentability - PCT/US06/020640 - International Bureau of WIPO - Switzerland - Nov. 30, 2007.

* cited by examiner

*Primary Examiner*—Reginald G Bragdon
*Assistant Examiner*—Shawn X Gu
(74) *Attorney, Agent, or Firm*—Peter M. Kamarchik; Nicholas J. Pauley; Sam Talpalatsky (57) ABSTRACT

Techniques for processing transmissions in a communications (e.g., CDMA) system including the use of a digital signal processor. The digital signal processor includes a cache memory system and associates a plurality of cache memory match lines with addressable memory lines of an addressable memory. Each of the cache memory match lines associates with one of corresponding sets of the cache memory. The method and system maintain each of the cache memory match lines at a low voltage. Once the digital signal processor initiates a search of the cache memory for retrieving data from a selected one of the corresponding sets of the cache memory, a match line drive circuit drives one of the cache memory match lines from a low voltage to a high voltage. The selected one of the cache memory match lines corresponds to the selected one of the corresponding sets of the cache memory. The digital signal processor compares the selected one of the cache memory match lines to an associated one of the addressable memory lines. Following the comparison step, the process returns the one of the cache memory match lines to the low voltage.

19 Claims, 5 Drawing Sheets

LOW POWER MICROPROCESSOR CACHE MEMORY AND METHOD OF OPERATION

FIELD

The disclosed subject matter relates to data communications. More particularly, this disclosure relates to a novel and improved low power microprocessor cache memory and method of operation in a digital signal processor.

DESCRIPTION OF THE RELATED ART

A modern day communications system must support a variety of applications. One such communications system is a code division multiple access (CDMA) system that supports voice and data communication between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "$3^{rd}$ Generation Partnership Project" (3GPP) and embodied in a set of documents including Document Nos. 3G TS 25.211, 3G TS 25.212, 3G TS 25.213, and 3G TS 25.114, which are readily available to the public. The 3GPP standard is hereinafter referred to as the W-CDMA standard.

Digital signal processors (DSPs) may find valuable use in wireless handsets and other electronic devices that comply with the above standards. In particular, wireless handsets and such devices are requiring and increasingly will require that the DSP execute instructions from user-orientation, scientific, and multimedia applications, as well as many other types of applications. The processor resource requirements may vary widely and dynamically for applications such as television broadcasts, streaming message tickers, electronic mail (including messages with attached documents), as well as resident applications, such as photography and PDA applications, all from the same DSP.

In wireless handsets and similar communications devices, there is the need to extend the battery life. Energy conservation, therefore, presents a critical consideration in the operating characteristics of such devices. With this consideration in mind, it is important to consider that memory and data cache resources constitute a major portion of the wireless handset electrical load. In fact, the power to operate data and instruction caches represents as much as 30% of the total power consumption of a wireless handset microprocessor.

In cache memory devices, there is the need to conserve energy both dynamically and statically. That is, there is the need to conserve energy in the use of a cache memory device at all times of DSP operation and even when no direct access to the cache memory occurs, i.e., during static operation. Also, there is the need to conserve energy when the DSP accesses the cache memory, i.e., during dynamic operation. One approach to saving energy in the use of cache memories for certain low power processors implements a cache lookup or searching operations serially.

In a serial cache lookup, a hit condition is determined prior to data access. The hit condition may be determined by accessing a content addressable memory- (CAM-) based tag. A CAM-based tag is organized into selectable sets so that the cache tag value to match is only presented to the selected set. The selected cache set is determined by a set index of the accessed address of main memory. So, if a hit will occur, the CAM-based tag specifies and activates a match line corresponding to the hit location.

By selectably identifying a match line, a reduction in energy consumption occurs for the serially addressable cache memory as compared to the parallel addressable cache memory. This is because parallel addressable cache memories fire all cache ways simultaneously during dynamic operation. Since all cache memory sets fire during parallel addressable cache operation, those sets not matching or containing valid content fire unnecessarily. The result is unnecessary energy loss.

In both known serially and parallel addressable cache memories, match lines are always pre-charged. CAM-based cache configurations include match lines that are pre-charged in the pre-charge phase. The match lines remain high in the evaluate phase on a match or hit, and are discharged on a mismatch or miss. In such circuits, a "foot" or "sleep" transistor may be used to reduced leakage currents that arise during both static and dynamic cache memory operation. While this approach may reduce some energy leakage, the existence of a pre-charge on all match lines yet results in energy loss. Moreover, in cache memories that employ a "sleep" transistor, otherwise undesirable impedance exists in the cache memory circuit.

Accordingly, a need exists for a cache memory circuit for operation in a DSP or similar electronic circuit that avoids both static and dynamic energy losses during DSP operation.

A further need exists for a DSP that avoids the use of a "foot" or "sleep" transistor and the concomitant inefficiencies and leakage that may occur in associating such an element with a cache memory circuit.

SUMMARY

Techniques for making and using a low power microprocessor cache memory and method of operation are disclosed, which techniques improve both the operation of the associated digital signal processor and promote the energy efficient use of memory circuitry associated with such digital signal processors and similar component. Such techniques may provide beneficial results in a variety of applications such as personal computers, personal digital assistants, wireless handsets, and similar electronic devices.

According to one aspect of the disclosed subject matter, there is provided a method and a system for providing a low power cache memory circuit for a digital signal processor that associates the cache memory with a plurality of cache memory match lines. The cache memory match lines associate with addressable memory lines of an addressable memory. Each of the cache memory match lines associates with one of corresponding sets of the cache memory. The method and system maintain each of the cache memory match lines at a low voltage. Once the digital signal processor initiates a search of the cache memory for retrieving data from a selected one of the corresponding sets of the cache memory, a match line drive circuit drives one of the cache memory match lines from a low voltage to a high voltage. The selected one of the cache memory match lines corresponds to the selected one of the corresponding sets of the cache memory. The digital signal processor compares the selected one of the cache memory match lines to an associated one of the addressable memory lines. Following the comparison step, the process returns the one of the cache memory match lines to the low voltage.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
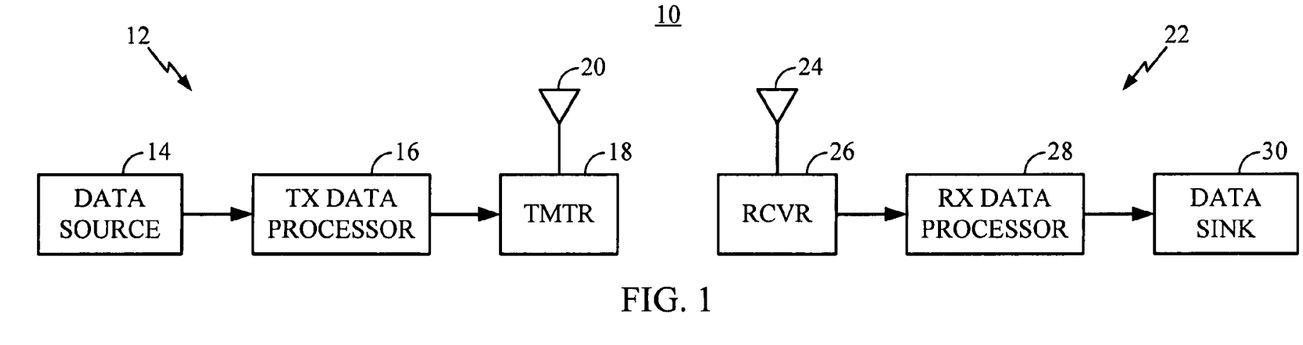
FIG. 1 is a simplified block diagram of a communications system for implementing the present embodiment.

FIG. 1 is a simplified block diagram of a communications system 10 that can implement the presented embodiments. At a transmitter unit 12, data is sent, typically in sets, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity.

Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
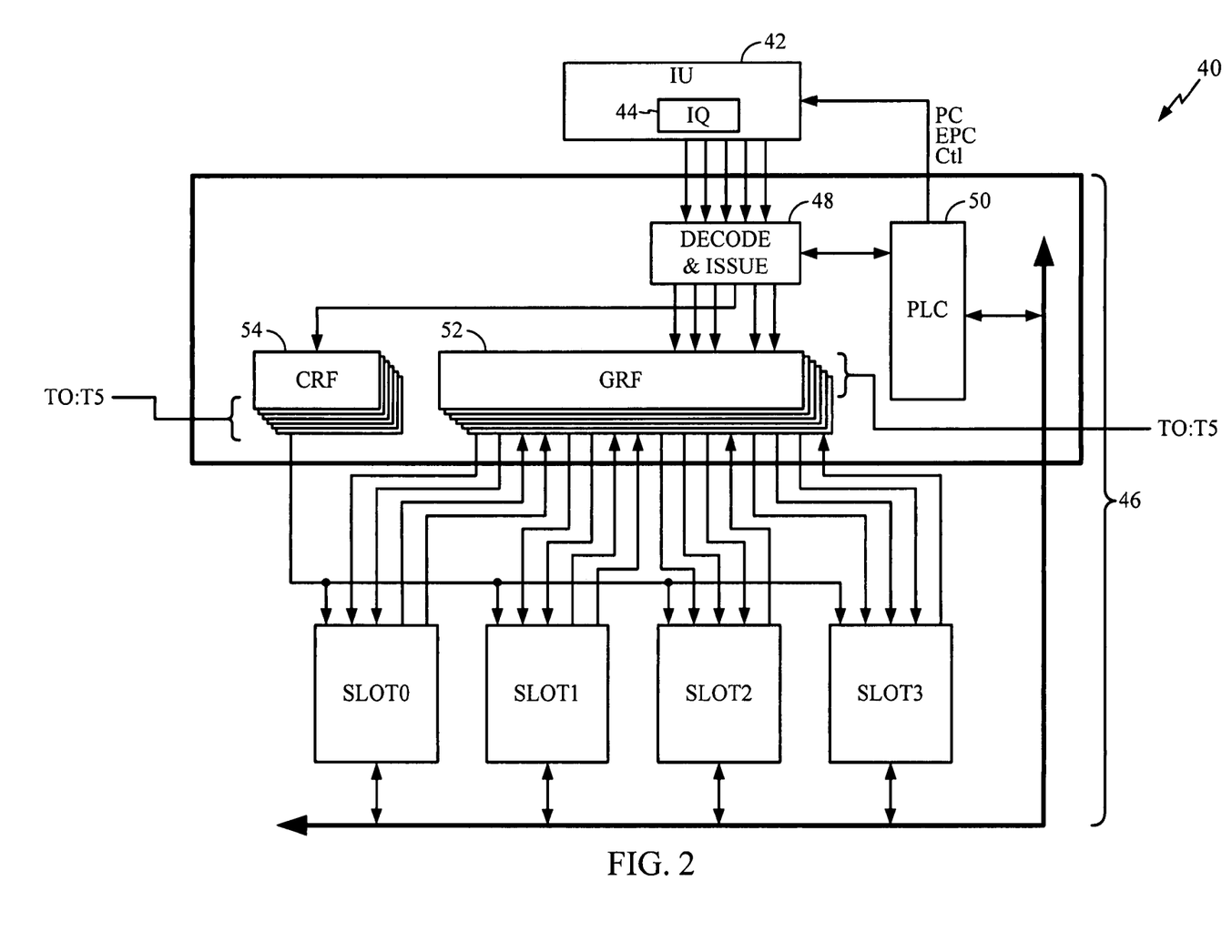
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. Recognize that DSP 40 only represents one embodiment among a great many of possible digital signal processor embodiments that may effectively use the teachings and concepts here presented. In DSP 40, therefore, threads T0 through T5 ("T0:T5"), contain sets of instructions from different threads. Instruction unit (IU) 42 fetches instructions for threads T0:T5. IU 42 queues instructions I0 through I3 ("I0: I3") into instruction queue (IQ) 44. IQ 44 issues instructions I0:I3 into processor pipeline 46. Processor pipeline 46 includes control circuitry as well as a data path. From IQ 44, a single thread, e.g., thread T0, may be selected by decode and issue circuit 48. Pipeline logic control unit (PLC) 50 provides logic control to decode and issue circuitry 48 and IU 42.

IQ 44 in IU 42 keeps a sliding buffer of the instruction stream. Each of the six threads T0:T5 that DSP 40 supports has a separate eight-entry IQ 44, where each entry may store one VLIW packet or up to four individual instructions. Decode and issue circuitry 48 logic is shared by all threads for decoding and issuing a VLIW packet or up to two superscalar instructions at a time, as well as for generating control buses and operands for each pipeline SLOT0:SLOT3. In addition, decode and issue circuitry 48 does slot assignment and dependency check between the two oldest valid instructions in IQ 44 entry for instruction issue using, for example, using superscalar issuing techniques. PLC 50 logic is shared by all threads for resolving exceptions and detecting pipeline stall conditions such as thread enable/disable, replay conditions, maintains program flow etc.

In operation, general register file (GRF) 52 and control register file (CRF) 54 of selected thread is read, and read data is sent to execution data paths for SLOT0:SLOT3. SLOT0: SLOT3, in this example, provide for the packet grouping combination employed in the present embodiment. Output from SLOT0:SLOT3 returns the results from the operations of DSP 40.

The present embodiment, therefore, may employ a hybrid of a heterogeneous element processor (HEP) system using a single microprocessor with up to six threads, T0:T5. Processor pipeline 46 has six pipeline stages, matching the minimum number of processor cycles necessary to fetch a data item from IU 42. DSP 40 concurrently executes instructions of different threads T0:T5 within a processor pipeline 46. That is, DSP 40 provides six independent program counters, an internal tagging mechanism to distinguish instructions of threads T0:T5 within processor pipeline 46, and a mechanism that triggers a thread switch. Thread-switch overhead varies from zero to only a few cycles.

Figure 3:
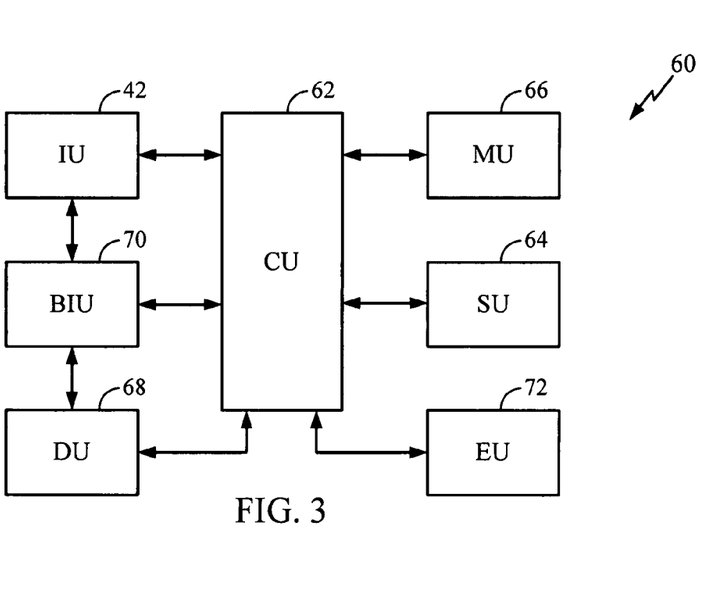
FIG. 3 presents a top level diagram of a control unit, data unit, and other digital signal processor functional units in a pipeline employing the disclosed embodiment.

FIG. 3 provides a brief overview of the DSP 40 micro-architecture for one manifestation of the disclosed subject matter. Implementations of the DSP 40 micro-architecture support interleaved multithreading (IMT). The subject matter here disclosed deals with the execution model of a single thread. The software model of IMT can be thought of as a shared memory multiprocessor. A single thread sees a complete uni-processor DSP 40 with all registers and instructions available. Through coherent shared memory facilities, this thread is able to communicate and synchronize with other threads. Whether these other threads are running on the same processor or another processor is largely transparent to user-level software.

Turning to FIG. 3, the present micro-architecture 60 for DSP 40 includes control unit (CU) 62, which performs many of the control functions for processor pipeline 46. CU 62 schedules threads and requests mixed 16-bit and 32-bit instructions from IU 42. CU 62, furthermore, schedules and issues instructions to three execution units, shift-type unit (SU) 64, multiply-type unit (MU) 66, and load/store unit (DU) 68. CU 62 also performs superscalar dependency checks. Bus interface unit (BIU) 70 interfaces IU 42 and DU 68 to a system bus (not shown).

SLOT0 and SLOT1 pipelines are in DU 68, SLOT2 is in MU 66, and SLOT3 is in SU 64. CU 62 provides source operands and control buses to pipelines SLOT0:SLOT3 and handles GRF 52 and CRF 54 file updates. GRF 52 holds thirty-two 32-bit registers which can be accessed as single registers, or as aligned 64-bit pairs. Micro-architecture 60 features a hybrid execution model that mixes the advantages of superscalar and VLIW execution. Superscalar issue has the advantage that no software information is needed to find independent instructions. A register file pipeline stage, RF, provides for registry file updating. Two execution pipeline stages, EX1 and EX2, support instruction execution, while a third execution pipeline stage, EX3, provides both instruction execution and register file update. During the execution, (EX1, EX2, and EX3) and writeback (WB) pipeline stages IU 42 builds the next IQ 44 entry to be executed. Finally, write-back pipeline stage, WB, performs register update. The staggered write to register file operation is possible due to IMT micro-architecture and saves the number of write ports per thread. Because the pipelines have six stages, CU 52 may issue up to six different threads.

Figure 4:
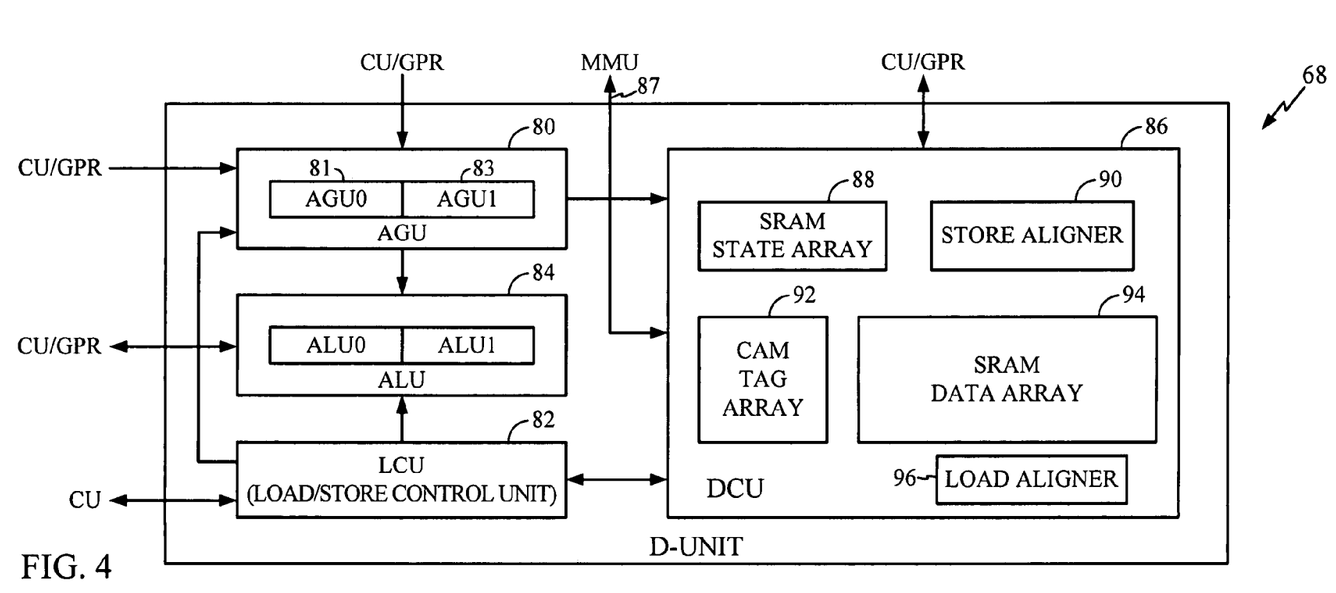
FIG. 4 presents a representative data unit block partitioning for the disclosed subject matter.

FIG. 4 presents a representative data unit, DU 68, block partitioning wherein may apply the disclosed subject matter. DU 68 includes AGU 80, which further includes AGU0 81 and AGU1 83 for receiving input from CU 62. Load/store control unit ("LCU") 82 also communicates with CU 62 and provides control signals to AGU 80 and ALU 84, as well as communicates with data cache unit, DCU 86. ALU 84 also receives input from AGU 80 and CU 62. Output from AGU 80 goes to DCU 86. DCU 86 communicates with memory management unit ("MMU") 87 and CU 62. DCU 86 includes SRAM state array circuit 88, store aligner circuit 90, CAM tag array 92, SRAM data array 94, and load aligner circuit 96.

DU 68 executes load-type, store-type, and 32-bit instructions from ALU 84. The major features of the DU 68 include fully pipelined operation in all of DSP 40 pipeline stages RF, EX1, EX2, EX3, and WB pipeline stages using the two parallel pipelines of SLOT0 and SLOT1. DU 68 may accept either VLIW or superscalar dual instruction issue, wherein preferably SLOT0 executes uncacheable or cacheable load or store instructions, 32-bit ALU 84 instructions, and DCU 86 instructions. SLOT1 executes uncacheable or cacheable load instructions and 32-bit ALU 84 instructions.

DCU 86 provides a physically tagged multi-way and employs a serial tag-data lookup. DU 68 operation includes pseudo-dual ported supporting simultaneous access from SLOT0 and SLOT1 in a 16-way set associative architecture. With a 32 KB capacity and 32-bit line size, DU 68 may be shared among all six threads, T0:T5. Moreover, DU 68 provides a "not recently used" replacement policy together with an inter-thread non-blocking operation. With page configurable write-through and write-back and cache locking by individual lines, DU 68 provides an 8 KB tightly coupled memory (TCM) in one embodiment.

The following description details certain further features and functions of DCU 86. DU 68 executes cache instructions for managing data cache functions of DCU 86. Cache instructions allow specific cache lines to be locked and unlocked, invalidated, and allocated to a GRF 52 specified cache line. There is also an instruction to globally invalidate the cache store/retrieve instructions. These instructions are pipelined similar to the load and store instructions. For loads and stores to cacheable locations that miss the data cache, and for uncacheable accesses, DU 68 presents requests to BIU 70. Load misses present a line fill request. Uncacheable loads present a read request. Store hits, misses and uncacheable stores present a write request.

DU 68 tracks outstanding read and line fill requests to BIU 70. BIU 70 directs the data received for these request to DU 68. DU 68 provides non-blocking inter-thread operations that allow accesses by other threads while one or more threads are blocked pending completion of outstanding load requests. Since DSP 40 is an IMT machine. The usual load-use pipeline distance criticality of single thread pipelined machines does not apply. If a load updates the GRF 52, the earliest next use may be six cycles later, in order to satisfy the shortest possible load-use requirements. Therefore, DCU 86 performs a serial tag look-up followed by data access. This saves energy by only accessing the cache line that hit in the data array.

Figure 5:
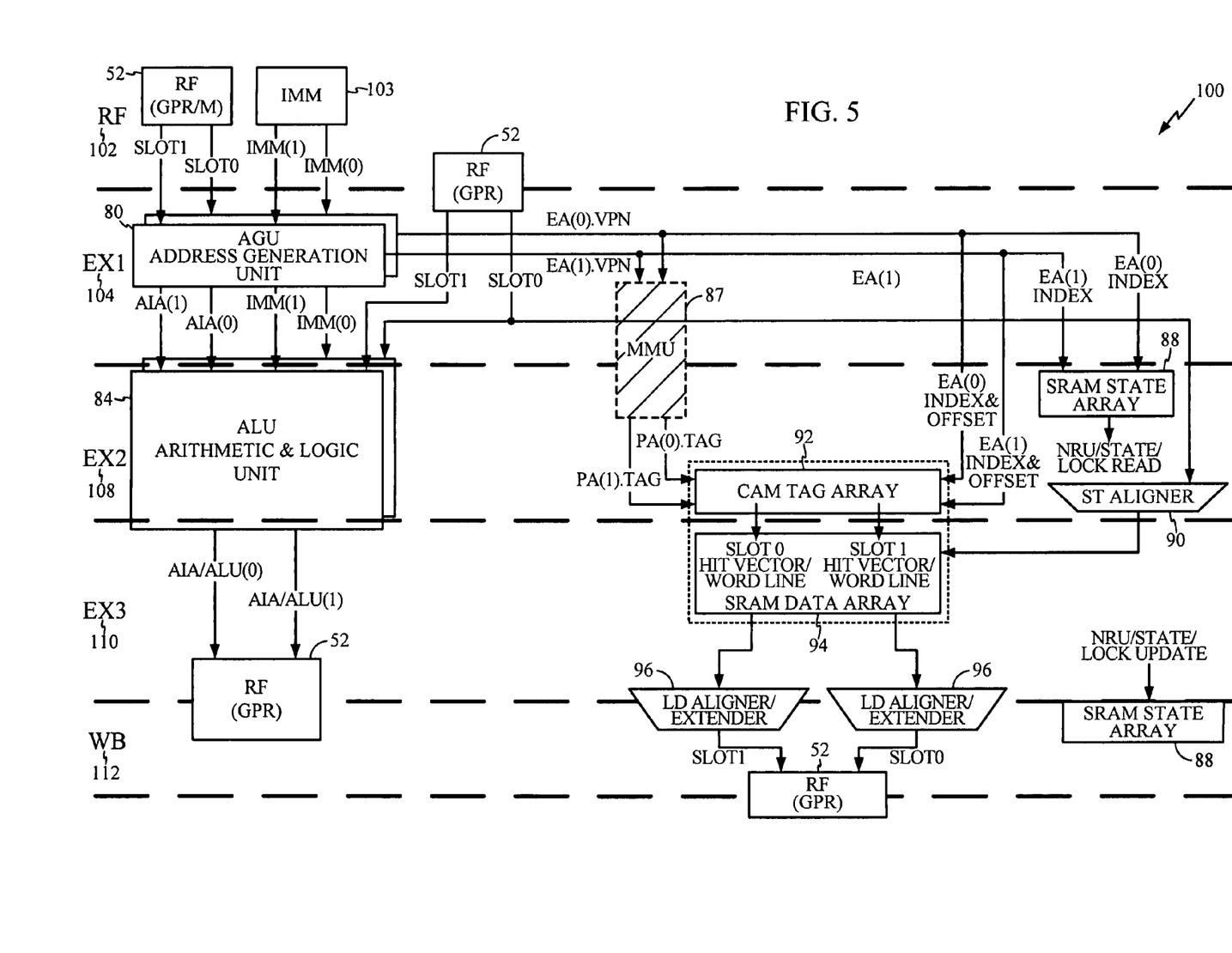
FIG. 5 portrays the digital signal processor pipeline operation of the data unit of the disclosed subject matter.

FIG. 5 portrays the operation of the data unit 68 within the operation of a DSP 40 pipeline 100. In RF pipeline stage 102, AGU 80 receives inputs (a) from GRF 52 of SLOT0 and SLOT1, and (b) from IMM 103 of immediate operands IMM(0) and IMM(1). AGU 80, during EX1 pipeline stage 104, provides AGU0 81 and AGU1 83 outputs to ALU 82 and SRAM state array 88, as well as input to MMU 87 and CAM tag array 92. Overlapping RF pipeline stage 102 and EX1 pipeline stage 104, output from RF 52 also goes to ALU 82. MMU 87, in response to input from AGU 80 provides input to CAM tag array 92 during EX2 pipeline stage 108. AGU 80 provides AIA(0) and AIA(1)output and IMM(0) and IMM(1) output to ALU 82. ALU 82 operates generally in EX2 pipeline stage 108 to produce output to RF 52 in the latter part of EX3 pipeline stage 110. MMU 87 provides output to CAM tag array 88 during EX2 pipeline stage 108. Meanwhile, SRAM state array 88 combines output into store aligner 90 during EX2 pipeline stage 108 for providing input to SRAM data array 94. SRAM data array 94 also receives input from CAM tag array 92. From SRAM data array 94, load aligner 96 receives input and, in response, generates SLOT0 and SLOT1 output to RF 52 during WB pipeline stage 112. Also in WB pipeline stage 88, SRAM state array 88 may receive NRU/state/lock/update signals.

DU 68, in other words, receives up to two decoded instructions per cycle, including immediate operands, from CU 62 via decode and issue circuit 48. In RF pipeline stage 102, DU 68 receives GRF 52 and/or CRF 54 source operands from the appropriate thread specific registers. The GRF operand is received from the GRF 52. In EX1 pipeline stage 104, DU 68 generates the effective address (EA) of a load or store memory instruction. EA signals are presented to the MMU 87, which performs the virtual to physical address translation and page level permissions checking and provides page level attributes. For accesses to cacheable locations, DU 68 looks up the data cache tag in EX2 pipeline stage 108 with the physical address. If the access hits, DU 68 performs the data array access EX3 pipeline stage 110.

For cacheable loads, the data read out of DCU 86 is aligned by the appropriate access size, zero/sign extended as specified and driven to the CU 62 in WB pipeline stage 112. Thereupon, the data may be written into the instruction specified GRF file. For cacheable stores, the data to be stored is read out of the thread specific register in the CU 62 in EX1 pipeline stage 104 and written into the data cache array on a hit in EX2 pipeline stage 108. For both loads and stores, auto-incremented addresses are generated in the EX1 pipeline stage 104 and EX2 pipeline stage 108. Then, loads and stores may be driven to CU 62 in EX3 pipeline stage 110 further to be written into the instruction specified GRF 52 file.

When executing ALU 84 instructions, DU 68 receives a GRF operand in RF pipeline stage 102 and a GRF operand in EX1 pipeline stage 104. ALU 84 arithmetic and compare instructions operate in EX2 pipeline stage 110, and the results go to CU 62 in EX3 pipeline stage for writeback. ALU 84 instructions involving byte shifting and sign/zero extension and use the load aligner in WB pipeline stage 112. ALU 84 subsequently sends the result to CU 62.

Although some instructions require two register reads (e.g., store instructions and certain some ALU instructions) or two register writes (e.g., auto-incremented load instructions), CU 62 only provides a single register read and a single register write port for DU 68 per thread. Since DSP 40 provides an IMT machine, the single read port may be time multiplexed for reads in RF pipeline stage 102 and EX1 pipeline stage 104, and the single write port may be time multiplexed for writes in EX3 pipeline stage 110 and WB pipeline stage 112.

The serial tag/data access of DCU 86 also enables stores to access the data array in EX3 pipeline stage 112, as loads since hit location is resolved in the prior EX2 pipeline stage 108. Thus, the usual single-thread store pipelining solutions such as separate store ports, store buffering or store to load forwarding are not required here for stall-free pipelining of stores.

The relaxed timing constraint on the hit determination also allows SRAM data array 94 of DCU 86 to be highly (e.g., 16-way) set associative which is suited to a six-way IMT machine. This minimizes cache conflicts among private data of each thread. SRAM data array 94 is shared among all the threads to leverage capacity efficiency of shared data. In addition, the shared SRAM data array 94 cache also removes the need for cache coherence mechanisms to maintain coherence among multiple shared copies.

Within the operation of DCU 86, the disclosed subject matter provides for selective pre-charge of CAM tag array 92 the match lines to save both static and dynamic power consumption. The present embodiment does not pre-charge the match lines when it is known that the associated set within CAM tag array 92 is not being accessed. The match lines are also not pre-charged when it is known that a particular set within SRAM data array 94 does not contain a valid line.

Thus, the present embodiment provides a selective pre-charge based on two factors. The first factor is set selection, and the second factor is valid state. In addition to CAM tag array 92, DCU 86 provides separate SRAM state array 88, which maintains an index address. Each entry contains the valid/invalid flag for every set of CAM tag array 92. Each match line is only pre-charged in the event that the associated set is selected and the set is valid.

By not pre-charging the match line of CAM tag array 92, leakage is eliminated during static operation. In addition dynamic power is also saved, because for traditional content addressable memories, the pre-charge is gated with the operation of the clock cycles. With the disclosed subject matter, the clock is gated so that it only sees loading from the pre-charged match lines. Consequently, dynamic loading of the DSP 40 and the associated power or energy consumption is also substantially reduced.

With continuing reference to FIG. 5, the follow details the pipeline operation of DCU 86 during CAM tag array 92 and related operations. Serial tag/data access operations enable stores to access SRAM data array 94 in the same EX3 pipeline stage 110 as loads since hit location is resolved in EX2 pipeline stage 104. Thus, the usual single-thread store pipelining solutions such as separate store ports, store buffering or store to load forwarding are not required here for stall-free pipelining of stores. The relaxed timing constraint on the hit determination also allows DCU 86 to be highly, e.g., 16-way, set associative.

Figure 6:
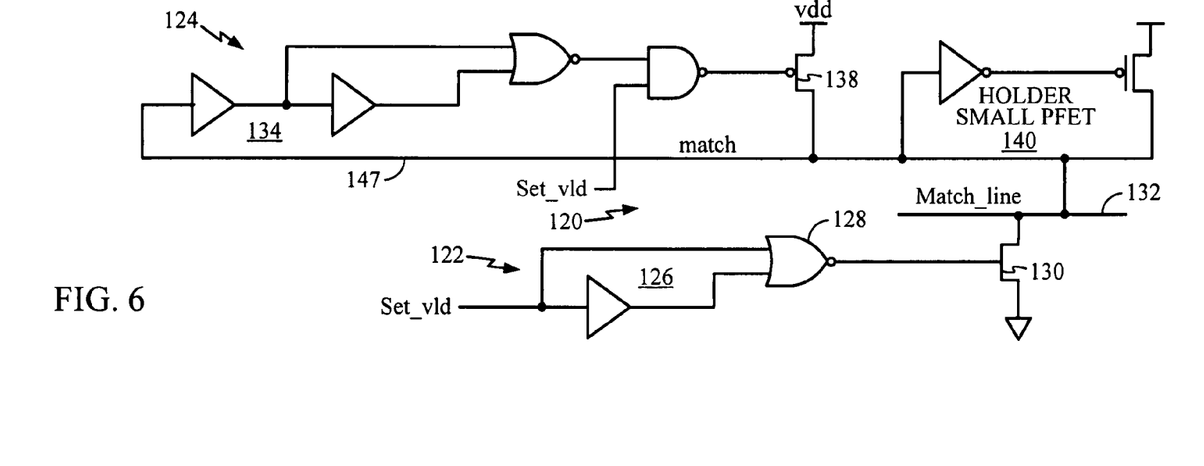
FIG. 6 provides a schematic of the data cache match line circuit of the claimed subject matter.

FIG. 6 provides a schematic of the data cache match line circuit 120 that associates with CAM tag array 92 of DCU 86. Data cache match line circuit 120 includes CAM discharge circuit 122 and CAM conditional self terminate pre-charge circuit 124. In CAM discharge circuit 122, Set_vld input goes to buffer 126, which, by way of inverter 128, provides input to NFET 130. When Set_vld is low, inverter 128 provides high input to NFET 130, causing match line 132 to remain low. CAM conditional self terminate pre-charge circuit 124 includes buffer circuit 134 that provides inverted match line 132 input to NOR gate 136. NOR gate 136 output goes to PFET 138, which turns on to connect match line 132 to $V_{dd}$. Holder circuit 140 maintains match line 132 at $V_{dd}$ for a sufficient period to retrieve data from the associated set of CAM tag array 92.

Match line 132, therefore is kept low during DSP 40 operation, except when the set is been selected for access. This is accomplished using the inverse of the Set_vld signal from inverter 128 as input to NFET 130, which pulls down match line 132. NFET 130 may be small size, in order to pull down match line 132.

The present embodiment provides dummy match line 147 which generates a trigger signal of the same value as match line 132. Holder circuit 140 protects the trigger signal from fading before the evaluation of CAM tag array 92. Fading may occur when Set_vld transitions from low to high too soon, resulting in a minimum delay, or when the Set_vld signal transitions from high to low too soon, causing dummy match line 147 to be pulled low. On the other hand, there is the need to shut off the pull down of the match line as soon as the Set_vld rises. This prevents power contention with the pre-charge circuit. As such, this requires turning off the NFET 130 pull down voltage as quickly as possible with the rise of Set_vld. However, it is preferable to a delay in turning on NFET 130. Therefore, the input to NFET 130 pull down is an output of NOR gate 136, with one input of the NOR gate 136 being delayed.

CAM tag array 92 includes 16 match lines 132, one for each set selectable by Set_vld circuitry. With the present embodiment, the transition from low to high voltage occurs to pre-charge match line 132 high only just before the search line is driven. Delay path 134 from match line 132 to PFET 138 pre-charge will turn off PFET 138, but the smaller PFET 140 will keep match line 132 high.

Now, a special case may occur when Set_vld signal stays high for the evaluation of CAM tag array 92. Accordingly, it is preferable to pre-charge only in the event that Set_vld is high for two consecutive cycles. On the other hand, the pre-charge should start as soon as Set_vld rises. The pre-charge should also terminate as soon as match line 132 is at $V_{dd}$ to prevent contention with the CAM tag array 92 pulldown. To satisfy all these requirements, data cache match line circuit 120 includes buffer circuits 126 and NOR gate 136. The delay of buffer circuit 136 equals the pre-charge time, e.g., ~200-300 ps, while the delay of buffer circuit 134 may be close to phase durations.

Since match line 132 is discharged low, no leakage occurs from any of the 40,960 (=40×64 [array size]×16 [match lines]) traditional leaking paths. Also, dynamic power losses are reduced, since there is no clock loading for addressing sets within CAM tag array 92. Instead, the clock is used only in the dummy row to gate the trigger signal. One embodiment of the disclosed subject matter may eliminate this clock function, if the clock is used on the wordline driver.

Figure 7:
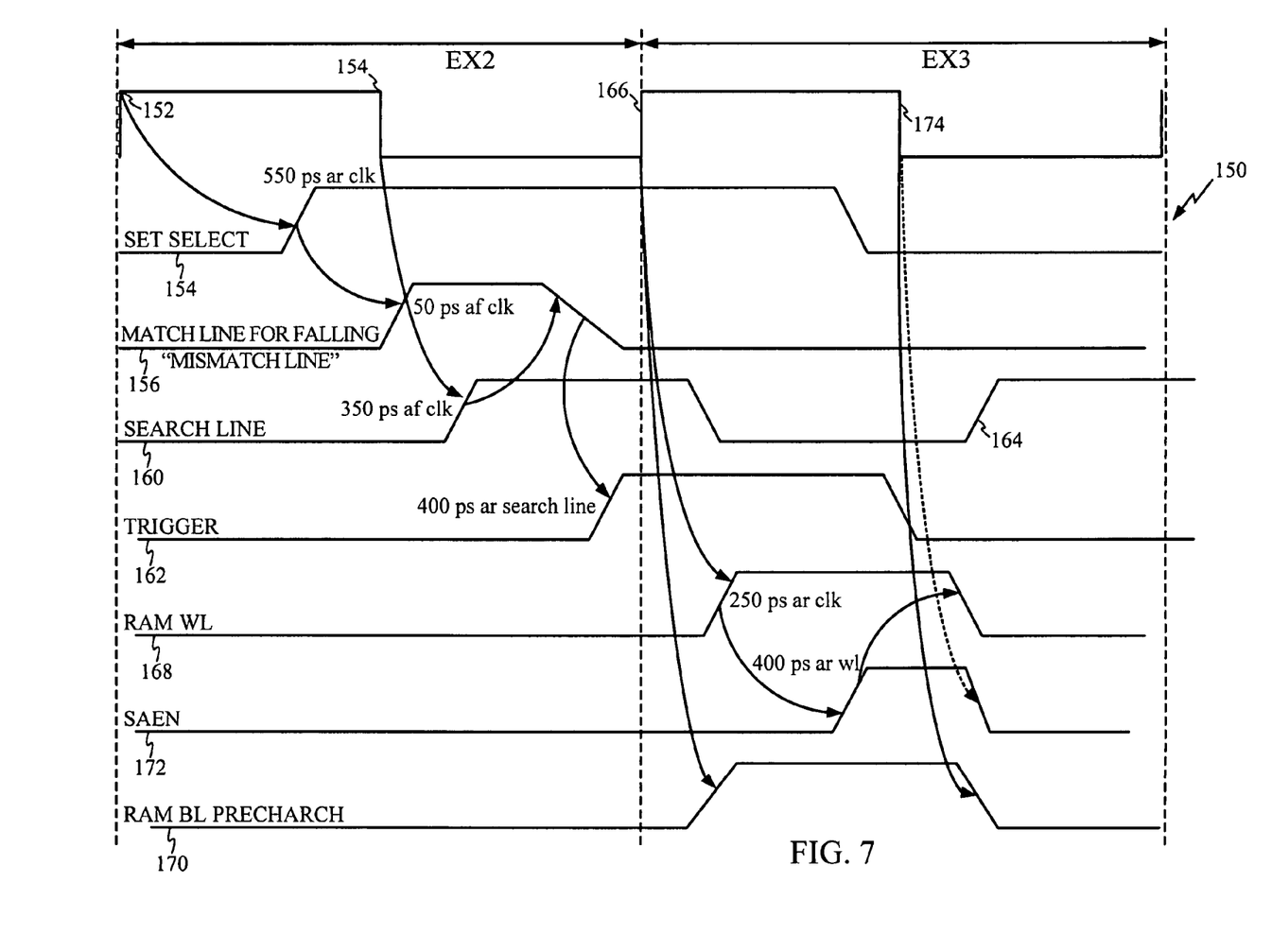
FIG. 7 shows a timing diagram corresponding to the operation of the low power cache of the disclosed embodiment.

FIG. 7 provides a timing diagram 150 for the operation of the disclosed subject matter with nominal times for circuit responses. Thus, beginning in EX2 pipeline stage 104 with rising clock 152, set select voltage 154 goes high and remains high for 550 ps. Then, in response to rising set select voltage 154, match line voltage 156 goes high and remains high until 50 ps after falling clock 158. After falling clock 158, search line voltage 160 goes high and remains high for 350 ps. In response, match line voltage 156 decays to low voltage. In response to falling match line voltage 156, trigger voltage 162 goes high and remains high until 400 ps after search line voltage 160 goes high.

At rising clock 166, RAM wordline voltage 168 and RAM bitline pre-charge voltage 170 go high. RAM wordline voltage 168 remains for 250 ps. Nominally, 400 ps after RAM wordline voltage 168 goes high, saen voltage 172 goes high. In response to sean voltage rising RAM wordline voltage 168 goes low. Also, at falling clock 174, saen voltage 172 and RAM bitline pre-charge voltage 170 return low. A second rise of search voltage 164 occurs during the fall of RAM wordline voltage 168 and saen voltage 172. Thus, after two clock cycles, search line voltage 164 remains high and all other voltages return to low voltage.

The disclosed subject matter, therefore, maintains match line 132 at a low or zero voltage. Only when data from a CAM tag array 92 cache set is needed, will match line 132 be charged. Once match line 132 is charged, DCU 86, and thus DSP 40 obtains the desired data. Then match line 132 voltage returns to low voltage. The result is a reduction or elimination of dynamic power losses by reducing clock loading to zero. That is, there is no need to obtain a signal load from the clock signal. The decode logic that determines the cache block from which data or instructions are sought provides the selective pre-charge for match line 132. The result is that the selective pre-charge of the present embodiment provides both the decode signal for selecting the specific cache block as well as the match line charge signal for charging the match line.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for operating a cache memory in association with an addressable memory of a digital signal processor, comprising the steps of:

associating a plurality of cache memory match lines with a plurality of addressable memory lines, each of said plurality of cache memory match lines associated with one of a plurality of corresponding sets of said cache memory;

storing a valid indicator for each corresponding set of said cache memory wherein said valid indicator is stored separately from said corresponding set of cache memory;

maintaining each cache memory match line of said plurality of cache memory match lines at a low voltage;

selecting a particular set of the cache memory, the selected set determined by a set index of a memory address of data to be retrieved from the cache memory;

determining whether said selected set of the cache memory contains valid data using the valid indicator corresponding to the selected set;

selectively pre-charging only one of said plurality of cache memory match lines that is associated with the selected set of the cache memory and only when the valid indicator corresponding to the selected set indicates that the selected set contains valid data; and performing a comparison operation that discharges the cache memory match line that is pre-charged and that is not associated with the memory address of the data to be retrieved, wherein the pre-charged cache memory match line is returned to said low voltage following the comparison operation.

2. The method of claim 1, further comprising holding one of said plurality of cache memory match lines at a high voltage using a holder circuit.

3. The method of claim 1, further comprising initiating a search of said cache memory according to content of said selected set.

4. The method of claim 1, further comprising operating said cache memory in association with a Static Random Access Memory (SRAM) data array.

5. The method of claim 1, further comprising operating said cache memory within a data unit of said digital signal processor.

6. The method of claim 1, further comprising operating said cache memory in an interleaved multithreaded processing mode.

7. The method of claim 1, wherein each cache memory match line of the plurality of cache memory match lines is maintained at the low voltage by a corresponding circuit that is responsive to set selection circuitry.

8. An integrated circuit forming a portion of a digital signal processor and operating a cache memory in association with an addressable memory of a microprocessor, the integrated circuit comprising:

a plurality of cache memory match lines;

a plurality of addressable memory lines associated with the addressable memory and said plurality of cache memory match lines, such that each of said plurality of cache memory match lines is associated with one of plurality of corresponding sets of said cache memory;

a match line drive circuit operative to drive each of said plurality of cache memory match lines to a low voltage and to maintain each of the plurality of cache memory match lines at the low voltage;

a cache memory search circuit operative to initiate a search of said cache memory to retrieve data from a selected set of said corresponding sets of said cache memory;

a cache memory state array operative to maintain a valid indicator associated with each of the plurality of corresponding sets of said cache memory wherein said cache memory state array is stored separately from said plurality of corresponding sets of said cache memory;

said match line drive circuit further operative to pre-charge only a cache memory match line of the plurality of cache memory match lines that corresponds to the selected set from the low voltage to a high voltage in response to said cache memory search circuit and said cache memory state array, such that each cache memory match line not corresponding to the selected set is maintained at the low voltage; and said match line drive circuit further operative to return the pre-charged cache memory match line of said plurality of cache memory match lines to said low voltage after performing a comparison at a content-addressable memory tag array.

9. The system of claim 8, further comprising a high voltage holding circuit operative to hold pre-charged cache memory match lines at said high voltage.

10. The system of claim 8, wherein said cache memory search circuit further comprises circuitry operative to initiate said search of said cache memory such that all match lines remain at the low voltage level until after the selected set is determined.

11. The system of claim 8, further comprising data cache unit circuitry operative to associate said cache memory in association with a Static Random Access Memory (SRAM) data array.

12. The system of claim 8, further comprising data unit circuitry associated with said addressable memory and said cache memory, the data unit operating said cache memory within said digital signal processor.

13. The system of claim 8, wherein the cache memory is operated in an interleaved multithreaded processing mode.

14. A cache memory comprising:
a plurality of match lines that are initially maintained at a low voltage;
a selection circuit to select a particular set of a plurality of sets of the cache memory;
pre-charge circuitry configured to pre-charge one match line of the plurality of match lines to a high voltage, the one match line associated with the particular set, and wherein the match lines of the plurality of match lines that are associated with sets other than the particular set are not pre-charged and are maintained at the low voltage;
tag array comparison circuitry to compare the particular set with a tag portion of a memory address of data to be retrieved from the cache memory to determine a matching entry of a tag array; and
discharge circuitry configured to discharge the match line that was pre-charged and not associated with the matching entry of the tag array to the low voltage during a discharge period, wherein if the match line that was pre-charged is associated with the matching entry of the tag array then it is maintained at the high voltage during the discharge period.

15. The cache of claim 14, wherein the plurality of sets comprise sets of a multi-way set-associative cache memory.

16. The cache of claim 14, wherein the tag array comparison circuitry is configured to enable a serial tag-data access operation that includes selecting the particular set prior to pre-charging the one match line associated with the particular set.

17. The cache of claim 16, wherein the tag array comparison circuitry compares the particular set with the tag portion of the memory address using a content-addressable memory (CAM).

18. The cache of claim 14, wherein the discharge circuitry is configured to selectively couple each of the plurality of match lines to ground.

19. The cache of claim 18, wherein the selection circuit selects the particular set based on a set index of a memory address of data to be retrieved from the cache memory and wherein the tag array comparison circuitry is configured to support a multi-way set-associative content-addressable memory (CAM) tag array lookup operation.

* * * * *